(12) United States Patent
Willsch

(10) Patent No.: US 8,938,140 B2
(45) Date of Patent: Jan. 20, 2015

(54) ADJUSTMENT DEVICE FOR COUPLED OPTICS FOR MEASURING USING FIBER-OPTIC SENSORS ON ROTATING PARTS

(75) Inventor: Michael Willsch, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 1010 days.

(21) Appl. No.: 12/743,493

(22) PCT Filed: Nov. 4, 2008

(86) PCT No.: PCT/EP2008/064921
§ 371 (c)(1),
(2), (4) Date: May 18, 2010

(87) PCT Pub. No.: WO2009/065727
PCT Pub. Date: May 28, 2009

(65) Prior Publication Data
US 2010/0247056 A1    Sep. 30, 2010

(30) Foreign Application Priority Data
Nov. 20, 2007 (EP) .................................. 07022464

(51) Int. Cl.
G02B 6/36 (2006.01)
G01D 5/353 (2006.01)
G01L 1/24 (2006.01)
G02B 6/38 (2006.01)

(52) U.S. Cl.
CPC .......... *G02B 6/3624* (2013.01); *G01D 5/35303* (2013.01); *G01L 1/246* (2013.01); *G02B 6/3604* (2013.01); *G02B 6/3803* (2013.01)
USPC ........................................................... 385/26

(58) Field of Classification Search
USPC .......................................... 385/134, 137, 147
See application file for complete search history.

(56) References Cited

U.S. PATENT DOCUMENTS 4,641,915 A * 2/1987 Asakawa et al. ................ 385/26
4,815,812 A * 3/1989 Miller ............................. 385/61
5,442,721 A * 8/1995 Ames ............................. 385/26
5,745,623 A   4/1998 Ohtomo et al.
(Continued)

FOREIGN PATENT DOCUMENTS

DE       100004661 A1    8/2001
DE       102 41 428 A1    3/2004
(Continued)

OTHER PUBLICATIONS

M. Seaver et al., "Strain Measurements from FBGs Embedded in Rotating Composite Propeller Blades", Proceedings of OSA/OFS 2006, Oct. 23, 2006, pp. 1-4, XP-002512784, Book 2006.
Communication from Japanese Patent Office listing cited references, received. Jan. 30, 2012, pp. 1-5.

*Primary Examiner* — Mike Stahl

(57) ABSTRACT

A device for transmitting or receiving a light beam is provided. The device includes an angular adjustment element and a fiber-optic cable which emits light and is connected to the angular adjustment element. The fiber-optic cable ends in the region of the angular adjustment element. The angular adjustment element enables a radiation direction of a light beam of the fiber-optic cable to be fixed, wherein, in at least some of possible radiation directions, the light beam passes through a fixed point which is independent of the radiation direction, wherein the fixed point lies outside the device.

15 Claims, 2 Drawing Sheets

(56) References Cited

U.S. PATENT DOCUMENTS

| | | | |
|---|---|---|---|
| 6,301,405 B1 * | 10/2001 | Keil | 385/25 |
| 7,044,653 B2 * | 5/2006 | Reis | 385/88 |
| 2001/0014195 A1 | 8/2001 | Engelhardt | |
| 2002/0129491 A1 | 9/2002 | Botos | |
| 2003/0063870 A1 | 4/2003 | Reis | |
| 2003/0128934 A1 * | 7/2003 | Tsao et al. | 385/52 |
| 2005/0253051 A1 * | 11/2005 | Hwang et al. | 250/227.18 |
| 2007/0268805 A1 * | 11/2007 | Popp et al. | 369/110.04 |

FOREIGN PATENT DOCUMENTS

| | | | |
|---|---|---|---|
| JP | 10009867 A | | 1/1998 |
| JP | 2001-183114 A | * | 7/2001 |
| JP | 2003123178 A | | 4/2003 |
| JP | 2004191498 A | | 7/2004 |
| WO | WO 96/07118 A2 | | 3/1996 |

* cited by examiner

ADJUSTMENT DEVICE FOR COUPLED OPTICS FOR MEASURING USING FIBER-OPTIC SENSORS ON ROTATING PARTS

CROSS REFERENCE TO RELATED APPLICATIONS

This application is the US National Stage of International Application No. PCT/EP2008/064921 filed Nov. 4, 2008, and claims the benefit thereof. The International Application claims the benefits of European Application No. 07022464.7 EP filed Nov. 20, 2007. All of the applications are incorporated by reference herein in their entirety.

FIELD OF INVENTION

The invention relates to an adjustment device for coupled optics for measuring using fiber-optic sensors on rotating parts, wherein a free light beam must bridge a space between two fiber-optic cables.

BACKGROUND OF INVENTION

Large electrical and thermodynamic machines in the power station sector are increasingly being operated nearer to the load limits of design and materials. Sensors are provided in order to detect a local overload, particularly on the rotating parts such as a rotor of such a machine. The sensors must be capable of being read wirelessly from outside. At the same time, there is particular interest in the determination of temperature distributions and strains.

There are different options for the wireless transmission of data measured by the sensors from the moving part of the machine and for the sensors themselves. One such option consists in the use of electrically operated sensors with a radio or infrared interface (IR) for data transmission. One of the disadvantages of this electrical option is that the sensors typically require auxiliary energy which must be provided to the rotating part with great complexity.

To avoid this disadvantage, there is a preference for using passive optical sensors, for example optical conductors with integral fiber Bragg gratings (FBG) as sensors for temperature and strain. These sensors are interrogated, i.e. a sensor signal is generated, by light being coupled into the optical conductor, for example, and the reflection behavior of one of the FBGs observed. A change in the reflection behavior suggests a strain or compression of the FBG due to mechanical loading or temperature change.

Free beam coupling by means of a lens collimator is required to bring the light to be coupled from the stationary evaluation unit to the moving machine part. The adjustment of the lens collimator is very complicated however, as typically a monomode fiber with a core diameter of only 5 to 9 μm is used as the optical conductor on the moving machine part. The spacing of the collimators from one another, i.e. the distance to be covered by the free light beam, is usually between 1 mm and 2 m. At the same time, the collimators can be mounted exactly on the axis of the machine so that light can be transmitted continuously. They can also be mounted outside the axis, wherein, in this case, light can only be transmitted when the collimators move past one another as part of the rotary movement.

SUMMARY OF INVENTION

There are four degrees of freedom of adjustment for coupling a parallel light beam into a glass fiber by means of a lens collimator. On the one hand, the light spot must fall in the middle of the lens of the receiving collimator. This results in two degrees of freedom which consist in a parallel shifting of the light beam. The further two degrees of freedom result from the fact that the light beam to be coupled should be aligned parallel to the optical axis of the receiving collimator so that the light is optimally coupled into the receiving optical fiber. This results in a 2-dimensional angular field for which suitable values must be found.

An object of the present invention is to specify a device which enables a light beam to be adjusted from a radiating side to a receiving side in a simplified manner. This object is achieved by a device according to the independent claim. The dependent claims relate to advantageous embodiments of the invention.

The device according to the invention for directional transmission and/or receiving of a light beam has an angular adjustment element and a radiating fiber-optic cable which is connected to the angular adjustment element. At the same time, the fiber-optic cable ends in the region of the angular adjustment element and consequently gives off light conducted by it.

The angular adjustment element is designed so that it enables the radiation direction of the light beam to be fixed or, put another way, to be varied, wherein, in at least some of the possible radiation directions, the light beam passes through a fixed point in space which is independent of the radiation direction, wherein the point lies outside the device.

At the same time, an end of a further fiber-optic cable or a lens surface of a lens collimator at the end of the further fiber-optic cable is preferably chosen as the point through which the light beam always passes. The angular adjustment element then always causes the light beam to fall exactly in the right place in the lens collimator or the fiber-optic cable, and only the incident radiation direction changes.

The invention therefore makes it possible to set up an optimum incident radiation angle for a pre-specified geometry, which by way of example consists of a space between a radiating end of the fiber-optic cable and the receiving end of the further fiber-optic cable and its relative length, in a simple manner. Within the framework of the given possibilities, this guarantees the highest possible transfer of optical power from the fiber-optic cable into the further fiber-optic cable, and therefore an optimum optical coupling of the two fiber-optic cables.

One option for the angular adjustment element consists in the use of a ball joint. This is designed in such a way that the movement of the end of the fiber-optic cable is controlled by means of an articulated structure so that the light beam always passes through the fixed point. A further option consists in the use of a spherical shell element on which a ball piece is moved so that one side always faces the point in space.

A preferred option for the angular adjustment element consists in using a goniometer stage. With the help of the goniometer stage, the end of the fiber-optic cable is moved along a curved line and in doing so swiveled so that the movement ultimately corresponds to the linear movement on a spherical surface. In doing so, the light beam remains directed towards the virtual centre of this sphere at all times. At the same time, the virtual centre is set so that it lies precisely at the end of the further fiber-optic cable or on the lens surface of the lens collimator at the end of the further fiber-optic cable.

The use of two coupled goniometer stages is particularly preferred. In doing so, these act at right angles to one another and thus enable the end of the fiber-optic cable to move in a curved plane and at the same time swivel so that the movement ultimately corresponds to the movement on a section of a spherical surface. In doing so, the light beam remains directed towards the virtual centre of this sphere at all times. At the same time, the virtual centre is again set so that it lies precisely at the end of the further fiber-optic cable or on the lens surface of the lens collimator at the end of the further fiber-optic cable. Particularly advantageously, this enables any alignment of the further fiber-optic cable to be corrected within the framework of the angular range which the goniometer stages are able to cover. Expressed another way, in all cases the light beam can be aligned parallel to the end of the further fiber-optic cable or the axis of the receiving collimator as long as said axis is not too greatly skewed with respect to the radiating fiber-optic cable.

Preferably, a lens collimator of known design is provided at the end of the radiating fiber-optic cable.

In a preferred embodiment of the invention, a linear adjustment element is also provided. This effects a parallel shift of the radiation direction and of the point in space in one or two directions perpendicular to the radiation direction. By this means, the point in space can be matched to the position of the further fiber-optic cable or the receiving collimator without changing the radiation direction, i.e. the incident radiation angle, at the same time.

The preferred location of the described device is a machine in which a first element and a second element which rotates or also moves linearly relative to the first element are provided. A device as previously described is then provided on one of the elements. Expediently, a further fiber-optic cable for transmitting incident light from the device is provided on the other element. In doing so, it is expedient if the end of the further fiber-optic cable on the second element also has a lens collimator, namely the receiving collimator.

The device for directional transmission and/or receiving of a light beam can also be provided on both elements. For example, an angular adjustment element for a first direction can be provided on the one element, and an angular adjustment element for a second direction perpendicular to the first direction can be provided on the other element.

It is expedient if the element which is at rest relative to the environment of the machine has a device for directional transmission and/or receiving of a light beam in which two goniometer stages are provided, and the element which rotates relative to the environment of the machine has only a receiving collimator.

In an advantageous embodiment of the invention, a value is determined which represents the proportion of power transmitted from the fiber-optic cable into the second fiber-optic cable, and, if the value passes through a definable threshold, a correction of the radiation direction is carried out by means of the angular adjustment element. Expressed another way, a controller checks whether the alignment of the light beam is still optimal or whether the transmitted power has reduced compared with the optimum value, and if necessary re-corrects the alignment. This enables an optimum optical coupling to be guaranteed even with a machine which is subject to severe mechanical loads and with which the alignment can therefore deteriorate with time.

It is particularly advantageous if the further fiber-optic cable is connected to at least one sensor for a physical quantity, or has such a sensor itself. For the latter, the further fiber-optic cable can have one or more fiber Bragg gratings (FBG) for example, by means of which a measurement of temperature or mechanical load can be carried out. To read out an FBG sensor, a light beam with a known spectrum can be fed into the fiber-optic cable on the stationary part of the machine. The light beam is transmitted into the further fiber-optic cable on a rotating part of the machine by means of the described device. This latter naturally only occurs at times when the further fiber-optic cable passes the device in the course of the rotary movement. The light beam is partially reflected at the FBG sensor and therefore returns via the device into the fiber-optic cable on the stationary machine element where the reflection can be evaluated.

By means of the device, it is ensured that an adequate optical power is exchanged between the fiber-optic cables, namely at some time after the machine is first assembled. In doing so, the adjustment itself can be carried out by motors or manually. On the other hand, with an appropriate design, readjustment while the machine is operating is also possible and in this case expediently by means of appropriate actuators.

The electrical machine can be a generator, for example. The first element is then a stator and the second element a rotor.

As well as this, the machine can also be a turbine system, for example a gas turbine or a steam turbine. The machine can also be other types of turbine which are not necessarily used to generate electricity.

BRIEF DESCRIPTION OF THE DRAWINGS

Preferred, but in no way restricting, exemplary embodiments of the invention are now explained in more detail with reference to the drawing. In doing so, the characteristics are shown schematically and corresponding characteristics are marked with the same references. In detail, the figures show FIG. 1 a turbine system with optical sensors, and
FIG. 2 an adjustment device.

DETAILED DESCRIPTION OF INVENTION

Figure 1:
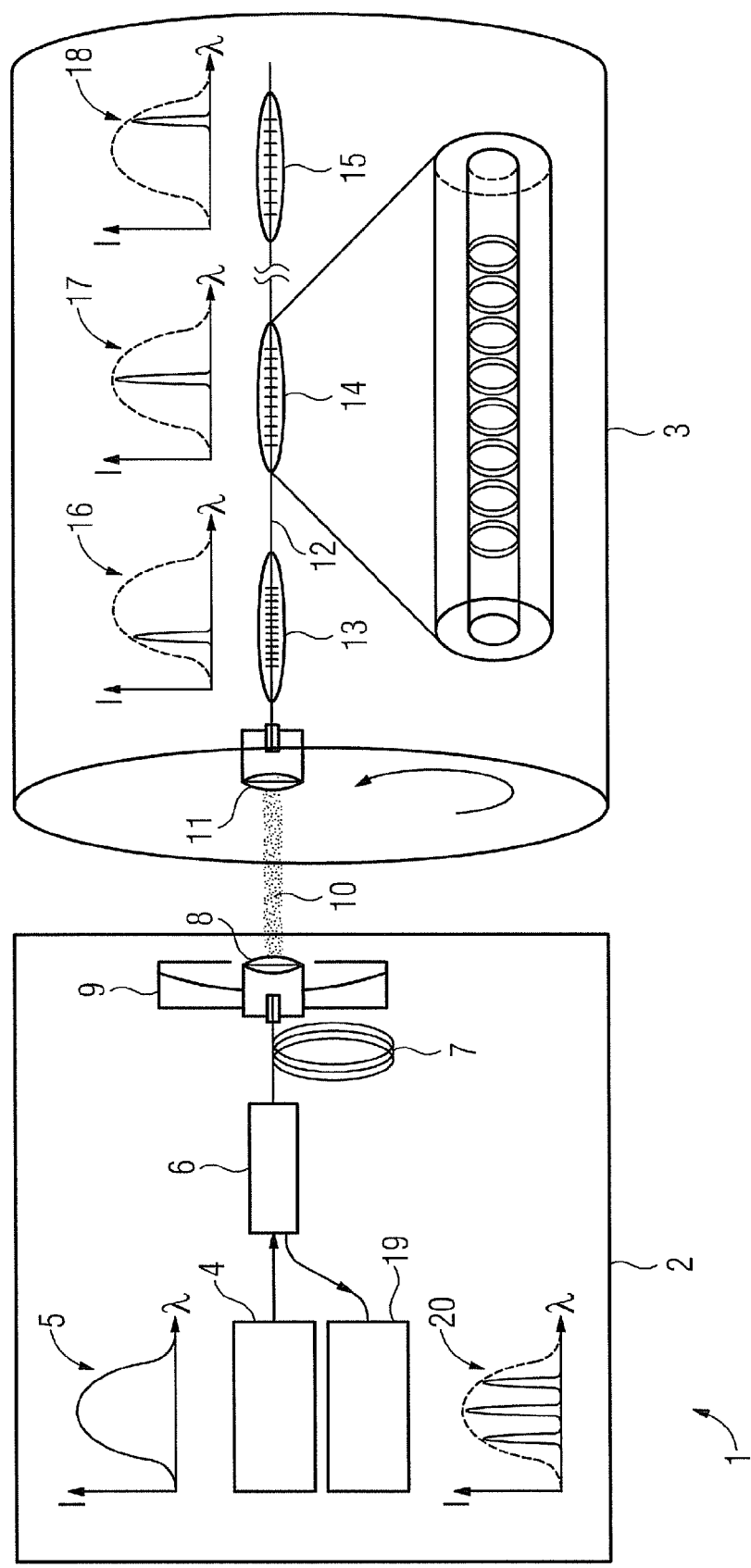

FIG. 1 shows highly schematically a part of a gas turbine system 1 which is relevant for the optical sensors. The gas turbine system 1 has a stationary housing 2 and a turbine blade 3 which is mounted so that it can rotate in the housing. The turbine blade 3 is provided with a series of fiber Bragg grating sensors 13 . . . 15. These are used to determine the temperature at different points on the turbine blade 3. The distributed temperature measurement enables overloads of the turbine blade 3 to be detected quickly and reliably, as a result of which the life of the turbine blade 3 and therefore of the gas turbine system 1 is increased.

The three fiber Bragg grating sensors 13 . . . 15 shown here by way of example are—likewise by way of example—addressed via a monomode glass fiber 12 and are therefore located on the same fiber. As is generally known, the Bragg gratings of the fiber Bragg grating sensors 13 . . . 15 can be designed in such a way that they respond on different wavelengths and therefore do not interfere with one another, or expressed another way, simultaneous reading is possible without any problems.

In order to interrogate a sensor value from one of the fiber Bragg grating sensors 13 . . . 15, as is known a light beam with a wide spectrum is expediently coupled into the monomode glass fiber 12. The light beam is then partially reflected at each of the fiber Bragg grating sensors 13 . . . 15, the amount reflected being determined by the reflection region 16 . . . 18 of each of the fiber Bragg grating sensors 13 . . . 15. As the turbine blade 3 is subject to extreme mechanical and thermal loads, all the remaining sensors, i.e. everything apart from the monomode glass fiber 12 with the fiber Bragg grating sensors 13 . . . 15, are mounted outside the turbine blade 3, i.e. in the stationary housing 2.

A light source 4, for example a light emitting diode, or SLED (super luminescent light emitting diode) is therefore provided in the housing 2. This produces an expediently relatively wide light spectrum which is coupled into a glass fiber 7. A free light beam 10 is generated in the area of the gap between the stationary housing 2 and the moving turbine blade 3 by means of a lens collimator 8 on the housing side which terminates the glass fiber 7. This runs to the lens collimator 11 on the turbine blade side which couples the light beam 10 into the monomode glass fiber 12.

After a reflection on the turbine blade 3, the rest of the generated light beam returns along the same path, i.e. via the lens collimator 11 on the turbine blade side to the lens collimator 8 on the housing side as light beam 10. The returning light beam is branched off at a splitter 6 to a spectrometer 19 in which an evaluation of the spectrum is carried out, from which in turn the measured values for the temperature or a mechanical load for example are generated.

In order to produce reliable and accurate measurements, it is advantageous when there is an optimum optical coupling between the monomode glass fiber 12 and the glass fiber 7. This means that as much as possible of the light power generated by the light source 4 should be transmitted over the gap between housing 2 and turbine blade 3 into the monomode glass fiber 12, and conversely as much as possible of the light power reflected in the fiber Bragg grating sensors 13 . . . 15 should also fall on the glass fiber 7 and therefore on the spectrometer 19 again.

In the following, it is assumed that an appropriate adjustment is made on the side of the housing 2 for this purpose. However, this is only to be taken as an example. The adjustment with the associated device can equally well be fitted on sides of the turbine blade 3 or even distributed on housing 2 and turbine blade 3.

Expediently, the adjustment includes a correct setting up of four degrees of freedom which are naturally not independent of one another. On the one hand, the light beam 10 must fall on the lens collimator 11 on the turbine blade side, i.e. the point of impact on the lens collimator 11 on the turbine blade side must be correctly adjusted in an imaginary plane perpendicular to the axis of the lens collimator 11 on the turbine blade side, which equates to two degrees of freedom.

In the present example, this is initially guaranteed by an appropriate pre-adjustment. Adjusting screws, for example, can be provided for this purpose, with which the radiation point, i.e. the position of the lens collimator 8 on the housing side, can be manually adjusted. The accuracy here in the given example must only be about 0.5 mm however.

When the point of impact 25 is correctly adjusted, the two further degrees of freedom must be set up appropriately. These consist in the correct incident radiation angle. This is optimum when the light beam 10 is exactly parallel to the lens collimator 11 on the turbine blade side or to the end of the monomode glass fiber 12. The adjustment device 9, which is only indicated in FIG. 1 and is shown in more detail in FIG. 2, is used for this device.

Figure 2:
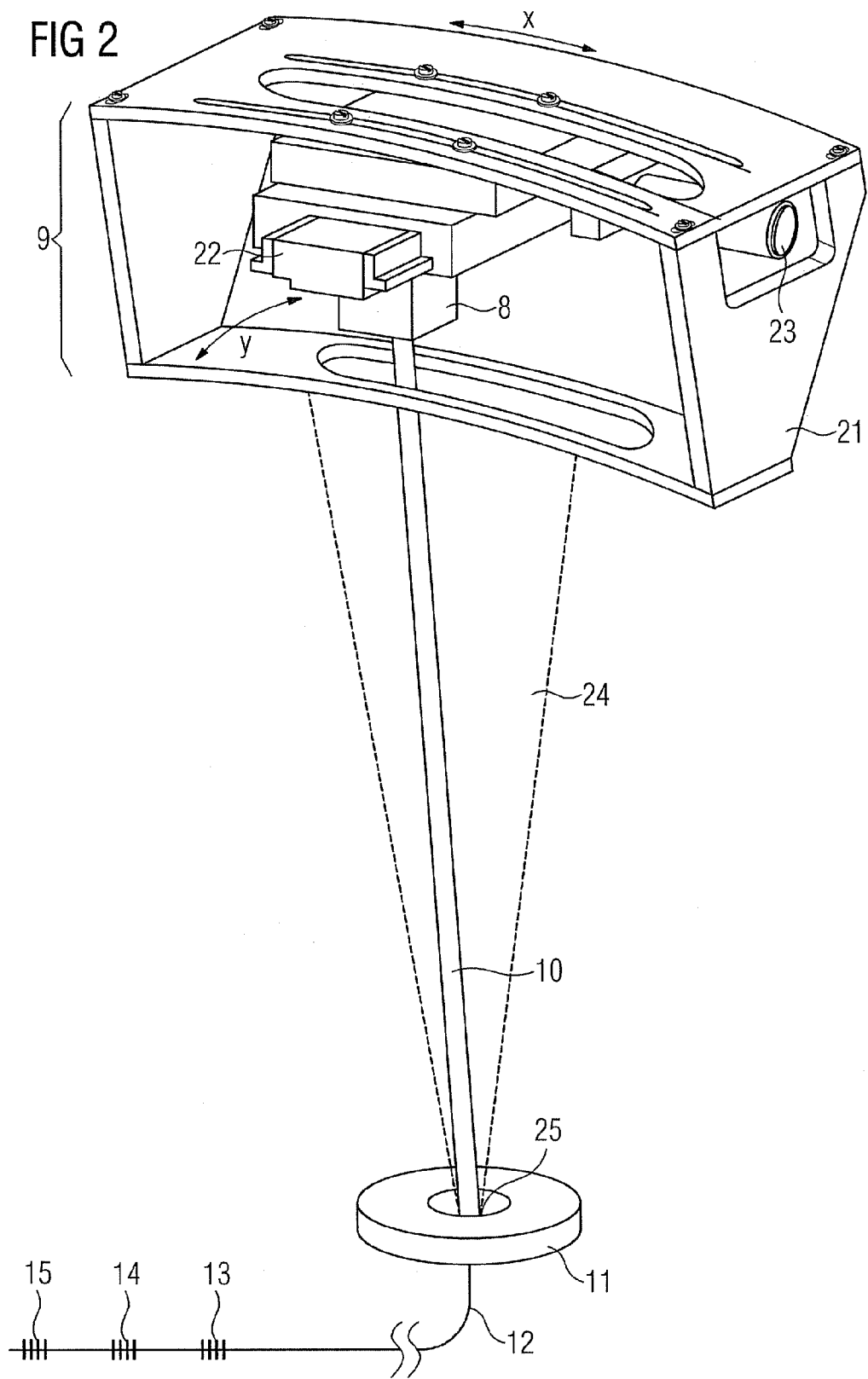

FIG. 2 shows the lens collimator 11 on the turbine blade side on the centre of which the free light beam 10 impinges. The monomode glass fiber 12 with the fiber Bragg grating sensors 13 . . . 15 is likewise indicated in FIG. 2. The light beam 10 emanates from the lens collimator 8 on the housing side on the side of the housing 2.

The lens collimator 8 on the housing side is mounted on a goniometer device 21. The goniometer device 21 has two goniometer stages and allows the free light beam 10 to be adjusted in the adjustment region 24. To adjust the angle, i.e. to set up the goniometer device 21, an adjusting screw 23 is provided on the side thereof. As, in doing so, the goniometer device 21 causes a movement of the lens collimator 8 on the housing side on a spherical surface, the light beam 10 always falls centrally on the lens collimator 11 on the turbine blade side. The light beam 10 can therefore be adjusted by means of the goniometer device 21 and a further goniometer stage, which is not shown in FIG. 2 for reasons of clarity, so that it is parallel to the end of the monomode glass fiber 12 or to the axis of the lens collimator 11 on the turbine blade side, and therefore an optimum optical coupling is guaranteed. As the light beam 10 is always transmitted parallel to the end of the monomode glass fiber 12 or the glass fiber 7, the coupling is then also optimum for the return direction in which the reflected part of the light transmitted from the light source 4 must bridge the gap between housing 2 and turbine blade 3.

The goniometer device 21 or the two goniometer stages 21 therefore ensure that, when the point of impact 25 is pre-specified, the angle of incidence can be adjusted, as a result of which the optical power coupled into the respective other fibers 7, 12 is maximized.

The manual set-up and adjustment of the point of impact 25 and incident radiation angle by means of the goniometer device 21 described in this example makes the structure simple and less susceptible. In exchange, optimum adjustment can only be carried out manually, i.e. during assembly of the gas turbine system 1 or when carrying out maintenance. A further alternative, i.e. a second exemplary embodiment, therefore consists in using motors which enable an automatic adjustment. The design of the adjustment device 9 is then more complex, but allows an adjustment without manually interfering with the gas turbine system 1.

Substantially the same design is used in the second exemplary embodiment as in the first exemplary embodiment. A linear adjustment element 22 in the area of the lens collimator 8 on the housing side is used which allows adjustment of the point of impact 25 by means of motors without simultaneously changing the incident radiation angle. At the same time, adjustment motors are also used for the two goniometer stages 21 which in turn allow an adjustment of the incident radiation angle without simultaneously changing the point of impact 25. By this means, when the adjustment motors are appropriately incorporated and controlled, an optimum optical coupling can be set up from outside the gas turbine system 1. In principle, this can also be done when the system is running.

In doing so, it is expedient if, when assembling the system, the best possible optical coupling which the design of the gas turbine system 1 allows is determined. This can be carried out manually. Alternatively, the angular range of the goniometer stage(s) 21 and the range of points of impact 25 can be scanned under machine control, and thus the settings at which the coupling is optimum can be detellnined automatically. These settings and/or the damping which then exists when the free light path passes through twice can for example be stored.

It is particularly advantageous when the design according to the second exemplary embodiment is used in order to use a closed-loop controller. This automatically checks whether the damping has deteriorated during operation. If this is the case, an attempt can be made to achieve the optimum damping value once more, i.e. the best possible coupling, under machine control by varying the settings for the linear actuator and/or the goniometer stages 21.

The invention claimed is:

1. A machine, comprising:
a first element;
a second element rotating relative to the first element, wherein the first element includes a device for transmitting or receiving a light beam, the device comprising:
an angular adjustment element; and
a first fiber-optic cable emitting light and being connected to the angular adjustment element,
wherein the first fiber-optic cable ends in a vicinity of the angular adjustment element,
wherein the angular adjustment element defines a radiation direction of a light beam of the first fiber-optic cable,
wherein, in at least some of possible radiation directions, the light beam passes through a fixed point which is independent of the radiation direction, wherein the fixed point lies outside the device;
wherein the second element comprises a second fiber-optic cable for transmitting incident light received from the first element, and
wherein the angular adjustment element comprises two goniometer stages, wherein an end of the first fiber-optic cable is movable on a section of a spherical surface.

2. The machine as claimed in claim 1, wherein an end of the second fiber-optic cable comprises a collimator.

3. The machine as claimed in claim 1,
wherein a value is determined which represents a proportion of power transmitted from the first fiber-optic cable into the second fiber-optic cable, and
wherein, when the value passes through a defined threshold, the radiation direction is corrected by the angular adjustment element.

4. The machine as claimed in claim 1, wherein the second fiber-optic cable is connected to a sensor for a physical quantity.

5. The machine as claimed in claim 1, wherein the second fiber-optic cable comprises a sensor for a physical quantity.

6. The machine as claimed in claim 1, wherein the machine is a electrical machine and the first element is a stator and the second element is a rotor.

7. A turbine system, comprising:
a first element, the first element being part of a housing of the turbine system; and
a second element rotating relative to the first element, the second element being part of a turbine blade of the turbine system,
wherein the first element includes a device for transmitting or receiving a light beam, the device comprising:
an angular adjustment element; and
a first fiber-optic cable emitting light and being connected to the angular adjustment element,
wherein the first fiber-optic cable ends in a vicinity of the angular adjustment element,
wherein the angular adjustment element defines a radiation direction of a light beam of the first fiber-optic cable,
wherein, in at least some of possible radiation directions, the light beam passes through a fixed point which is independent of the radiation direction, wherein the fixed point lies outside the device;
wherein the second element comprises a second fiber-optic cable for transmitting incident light received from the first element, and
wherein the angular adjustment element comprises two goniometer stages, wherein an end of the first fiber-optic cable is movable on a section of a spherical surface.

8. The turbine system as claimed in claim 7, wherein an end of the second fiber-optic cable comprises a collimator.

9. The turbine system as claimed in claim 7,
wherein a value is determined which represents a proportion of power transmitted from the first fiber-optic cable into the second fiber-optic cable, and
wherein, when the value passes through a defined threshold, the radiation direction is corrected by the angular adjustment element.

10. The turbine system as claimed in claim 7, wherein the second fiber-optic cable is connected to a sensor for a physical quantity.

11. The turbine system as claimed in claim 7, wherein the second fiber-optic cable comprises a sensor for a physical quantity.

12. The machine as claimed in claim 1, further comprising:
a collimator, the collimator being arranged at the end of the first fiber-optic cable.

13. The machine as claimed in claim 1, further comprising:
a linear adjustment element, the linear adjustment element providing a parallel shift of the radiation direction and the fixed point in one or two directions perpendicular to the radiation direction.

14. The turbine system as claimed in claim 7, further comprising:
a collimator, the collimator being arranged at the end of the first fiber-optic cable.

15. The turbine system as claimed in claim 7, further comprising:
a linear adjustment element, the linear adjustment element providing a parallel shift of the radiation direction and the fixed point in one or two directions perpendicular to the radiation direction.

* * * * *